July 15, 1969   L. ADELSON ET AL   3,456,171
OVERLAPPING END-CAP CAPACITOR CONSTRUCTION
Filed Jan. 25, 1968
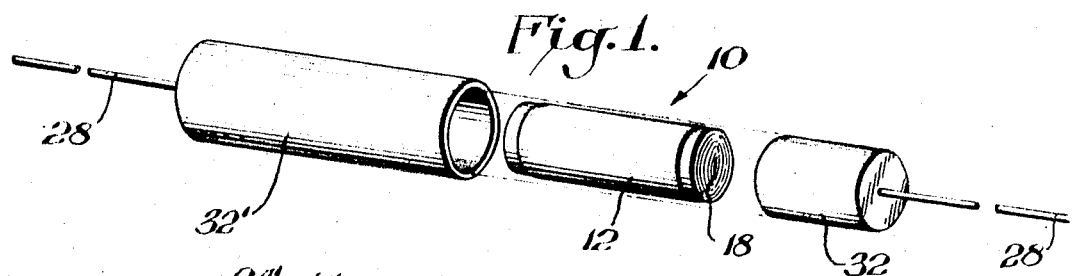
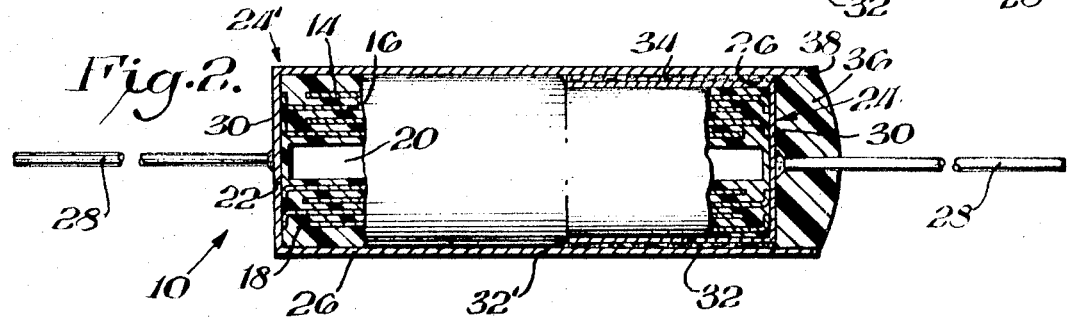
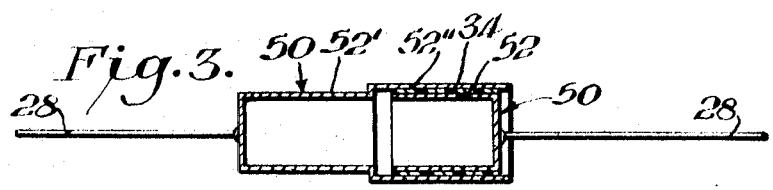
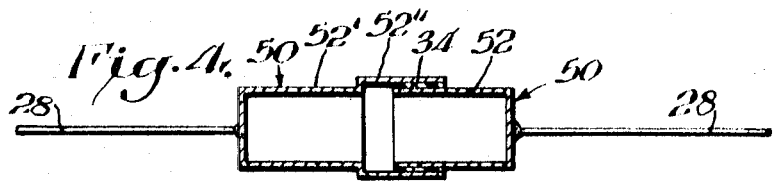
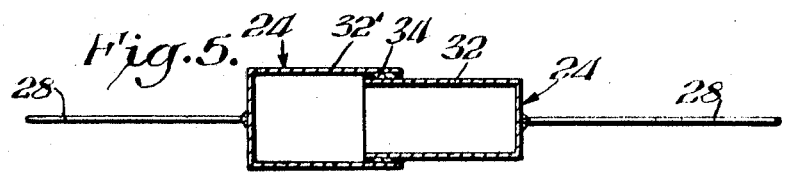
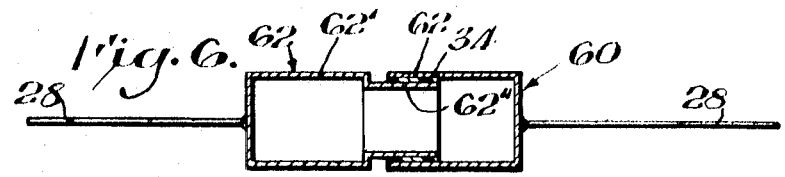

United States Patent Office 3,456,171
Patented July 15, 1969

3,456,171
OVERLAPPING END-CAP CAPACITOR
CONSTRUCTION
Leonard Adelson, Williamstown, Roald S. Magnussen, Clarksburg, and Matthew W. McNeary, Williamstown, Mass., assignors to Sprague Electric Company, North Adams, Mass., a corporation of Massachusetts
Filed Jan. 25, 1968, Ser. No. 700,427
Int. Cl. H01g 1/00
U.S. Cl. 317—260                                      4 Claims

ABSTRACT OF THE DISCLOSURE

A capacitance section having a pair of electrodes separated by dielectric material is provided with a first metallic end-cap mounted on one end of the capacitance section and electrically united to one of the pair of electrodes. A second metallic end-cap is mounted on the opposite end of the capacitance section in close-fitting and overlapping relationship with at least a portion of the first end-cap, and the second end-cap is electrically united to the other of the pair of electrodes. Insulation is provided between the close-fitting and overlapping portions of the end-caps.

Background of the invention

The present invention relates to a capacitor having a capacitance section and end-caps, and more particularly to a capacitor having close-fitting and overlapping end-caps that completely enclose the capacitance section.

Generally, many capacitors are sealed to protect them from external influences, such as moisture. For the most part, sealing of a capacitor enables it to function properly over extended periods of time, the net result being troubled-free capacitor operation. The most common sealing technique involves complete encapsulation of the entire capacitor with a resinous material with the exception of the portions used to connect the capacitor in an electric circuit. This necessarily results in an overall increase in the size of the capacitor and size is a critical factor in the manufacture of miniature electrostatic capacitors. Other capacitor sealing techniques involve soldering a glass cover in place over the open end of a metal capacitor case to thereby hermetically seal the capacitor in the case. These procedures are time consuming and expensive. Often an excess of solder flux used to bond the glass end cover to the metal capacitor case causes the flux to seep into the case and adversely affect the capacitor operation. The industry has long sought a sealed capacitor construction that avoids the shortcomings of the prior art, particularly one that has a full metallic casing that provides a reduced path for moisture penetration.

Accordingly, it is an object of the present invention to provide a sealed capacitor which is easy and inexpensive to produce and which functions in a highly satisfactory and beneficial manner for extended periods of time.

Summary of the invention

In accordance with the present invention a capacitor is provided comprising a capacitance section having a pair of electrodes separated by dielectric material. A first metallic end-cap mounted on one end of the capacitance section is electrically united to one of the pair of electrodes. A second metallic end-cap is mounted on the opposite end of the capacitance section in close-fitting and overlapping relationship with at least a portion of the first end-cap, and the second end-cap is electrically united to the other of the pair of electrodes. Insulation is provided between the close-fitting and overlapping portions of the end-caps.

The insulation may take the form of a preformed sleeve surrounding the portion of the first end-cap which is overlapped by the second end-cap. Moreover, a seal can be disposed between the first end-cap and the open end of the second end-cap. Additionally, a lead wire may be electrically secured to each of the end-caps.

The open end of the second end-cap may extend beyond the closed end of the first end-cap. Moreover, the end-caps have side wall structure of varying configurations to provide the close-fitting and overlapping end-cap relationship. In one embodiment of the invention, the first end-cap has a side wall in longitudinal alignment with a side wall portion of the second end-cap, and the second end-cap has another side wall portion which snugly surrounds the side wall of the first end-cap. Alternatively, the second end-cap can have a side wall in longitudinal alignment with a side wall portion of the first end-cap, and the first end-cap may have another side wall portion which is overlapped by the side wall of the second end-cap.

Brief description of the drawing

Novel features and advantages of the present invention in addition to those mentioned above will become apparent to one skilled in the art from a reading of the following detailed description in conjunction with the accompanying drawings wherein similar reference characters refer to similar parts and in which:

FIGURE 1 is an exploded perspective view of a capacitor according to the present invention;

FIGURE 2 is a longitudinal sectional view of the capacitor illustrated in FIGURE 1;

FIGURE 3 is a sectional view of another pair of capacitor end-caps according to the present invention;

FIGURE 4 is a sectional view of a still another pair of capacitor end-caps according to the present invention;

FIGURE 5 is a sectional view of another pair of capacitor end-caps according to the present invention; and FIGURE 6 is a sectional view of still another pair of capacitor end-caps according to the present invention.

Detailed description of the invention

Film capacitors are well known in the art and comprise capacitance sections having electrodes separated by and convolutely wound with plastic film dielectric ribbons. Metallized-film capacitance sections are also known in the art, and the present invention can be utilized with either of these constructions, as well as others. Film capacitors have been produced in both extended-foil sections and tab-wound sections. Extended-foil sections have an edge of one electrode extending from one end of the section and an edge of a second electrode extending from the opposite end of the section. Tab-wound sections have dielectric material extending beyond both edges of the electrodes with tabs contacting the individual electrodes and extending beyond the edges of the dielectric material. For purposes of illustration, the present invention will be described in conjunction with an extended-foil capacitance section although other capacitance sections may also be used to fabricate a capacitor according to this invention.

The drawing shows a capacitor 10 comprising a capacitance section 12 having electrodes 14 and 16 convolutely wound with plastic film dielectric material 18 in conventional extended-foil fashion. The term "extended-foil" is used in this application to define a capacitance section having a pair of electrodes in substantial capacitive relationship to one another; the edge of one electrode extends from one end of the section beyond the other electrode and the dielectric material, and the second of the pair of electrodes extends in a like manner from the opposite end of the section. As depicted in the drawing, this invention relates particularly to capacitance sections of low capacitance rating such that only a few turns of electrodes and dielectrics are required. For ease in handling and particularly for ease in rolling an automatic rolling equipment, these low capacitance rating sections take the form of a tube having an internal bore 20. While it will be understood that the construction of this invention is not limited in size, it is particularly adapted to miniature capacitors of less than 1 inch in length and less than ⅓ inch in diameter.

Electrodes 14 and 16 may be of any of the conventional materials used in electrostatic capacitors. Thus the electrodes may consist of discrete foils of aluminum or other generally recognized capacitance foils such as tin-lead alloys. In a like manner, dielectric material 18 may comprise any of the plastic film dielectric materials that are conventionally employed in electrostatic capacitors.

The present invention utilizes end-caps of terminals 24, which are essentially a cup-shaped member 26 integrated to a lead-wire 28. The present state of the welding art is such that terminals 24 can be consistently provided with lead-wires 28 which are centrally disposed and axially aligned with cups 26. An alternate method of fabricating end-caps 24 is to swage a lead-wire 28 into a centrally located square hole in the bottom 30 of cup 26 and thereafter hot tin the unit. Lead-wire 28 and cup 26 may be made of any suitable electrically conductive material. However, for the purposes of facilitating the resistance soldering techniques that form a preferred embodiment of carrying out this invention it has been found desirable to provide cups 26 with an inner surface of tin. In FIGURE 2, flat bottom 30 is brought into electrical contact with the extending edges of foils 14 and 16 at the respective ends of section 12. Terminal 24 is fixedly secured to section 12 by any of the conventional soldering techniques known to the capacitor art. The preferred embodiment of this invention utilizes resistance soldering to join tin coated terminal 24 to the tin alloy electrodes 14 and 16.

As shown in FIGURES 1–2, the end-caps 24 of capacitor 10 completely enclose the capacitance section 12. The right-hand end-cap 24, as viewed in FIGURE 2, has a circumferentially straight side wall 32 integrally connected to the flat bottom 30, and the left-hand end-cap 24 has a circumferentially straight side wall 32'. However, side wall 32' has an internal diameter slightly larger than the external diameter of side wall 32 by about 20 mils. As clearly evident from the drawing, the total length of the side walls 32, 32' of end-caps 24 is greater than the length of the capacitance section 12. Accordingly, when the end-caps are positioned over the capacitance section 12 a portion of the side wall 32' overlaps the side wall 32 in close-fitting relationship. Insulation in the form of a preformed sleeve or tape 34 is provided between the overlapping and close-fitting portons of the end-cap side walls. Preferably the sleeve is secured to the side wall 32 before the left-hand end-cap is positioned on the capacitance section 12. A final seal 36, such as an epoxy resin, is disposed between the right-hand end-cap and the open-end 38 of the left-hand end-cap.

Axial alignment of lead-wires 28 with capacitance section 12 is produced by firmly seating terminals 24 against the ends of section 12 with the cylindrical wall 32 of cup-shaped member 26 preventing lateral movement by engagement with the outer wraps of dielectric material 18.

FIGURES 3–6 illustrate other terminal configurations according to the present invention. In FIGURE 3 end-cap 50 has a side wall 52 which is in longitudinal alignment with a side wall portion 52' of the left-hand end-cap 52. The left-hand end-cap also includes another side wall portion 52" which overlaps but closely fits the side wall 52 of the right-hand end-cap and extends outwardly beyond the closed end of the right-hand end-cap. The end-cap configuration of FIGURE 4 is identical to the configuration shown in FIGURE 3 except that the side wall portion 52" does not extend beyond the closed end of the right-hand end-cap.

The arrangement of FIGURE 5 is similar to the end-cap configuration shown in FIGURES 1–2, except that the side wall 32' of the left-hand end-cap does not extend beyond the side wall 32 of the right-hand end-cap.

FIGURE 6 illustrates an end-cap arrangement wherein a right-hand end-cap 60 has a side wall 62 in longitudinal alignment with a side wall portion 62' of the left-hand end-cap 62. The left-hand end-cap also includes another side wall portion 62" which is overlapped by the side wall 62 of the right-hand end-cap.

What is claimed is:

1. A capacitor comprising a capacitance section having a pair of electrodes separated by dielectric material, a first metallic end-cap mounted on one end of the capacitance section and electrically united to one of the pair of electrodes, a second metallic end-cap mounted on the other end of the capacitance section in close-fitting and overlapping relationship with the first end-cap and electrically united to the other of the pair of electrodes, the open end of the second end-cap extends beyond the closed end of the first end-cap, insulation extending between the close-fitting and overlapping portions of the end-caps, and a resin seal filling the open end of the second end-cap.

2. A capacitor as in claim 1 wherein the insulation is in the form of a preformed sleeve surrounding the portion of the first end-cap which is overlapped by the second end-cap.

3. A capacitor as in claim 1 including a lead wire electrically secured to each of the end-caps.

4. A capacitor as in claim 1 wherein the first end-cap has a side wall in longitudinal alignment with a side wall portion of the second end-cap, and the second end-cap has another side wall portion which surrounds the side wall of the first end-cap.

References Cited

UNITED STATES PATENTS

| 3,114,087 | 12/1963 | Stamets | 317—242 X |
| 3,244,953 | 4/1966 | Walsh | 317—260 |

FOREIGN PATENTS

| 250,196 | 8/1926 | Great Britain. |

ELLIOTT A. GOLDBERG, Primary Examiner

U.S. Cl. X.R.

317—242